United States Patent
Gover et al.

(10) Patent No.: US 8,031,014 B2
(45) Date of Patent: Oct. 4, 2011

(54) SOLID STATE TERAHERTZ RADIATION FREQUENCY MULTIPLIER

(76) Inventors: Avraham Gover, Ramat Hasharon (IL); Menachem Nathan, Tel Aviv (IL); Yotam Schatzberg, Tel Aviv (IL)

(*) Notice: Subject to any disclaimer, the term of this patent is extended or adjusted under 35 U.S.C. 154(b) by 76 days.

(21) Appl. No.: 12/565,302

(22) Filed: Sep. 23, 2009

(65) Prior Publication Data
US 2010/0073110 A1    Mar. 25, 2010

Related U.S. Application Data

(60) Provisional application No. 61/099,592, filed on Sep. 24, 2008.

(51) Int. Cl.
*H03B 1/00* (2006.01)
*H03B 19/00* (2006.01)

(52) U.S. Cl. .............. 331/76; 331/42; 331/187; 333/34; 333/195; 333/208; 333/218; 333/248

(58) Field of Classification Search ............. 331/42, 331/76, 187; 330/5; 333/34, 35, 157, 195, 333/208, 218, 239, 248; 359/332; 385/28, 385/43, 50, 129
See application file for complete search history.

(56) References Cited

U.S. PATENT DOCUMENTS

| | | | | |
|---|---|---|---|---|
| 3,624,406 A * | 11/1971 | Martin et al. | ................. | 359/328 |
| 3,842,289 A * | 10/1974 | Yariv et al. | ..................... | 359/332 |
| 4,527,137 A * | 7/1985 | Hartley | ......................... | 333/137 |
| 4,996,505 A * | 2/1991 | Keilmann | ..................... | 333/218 |
| 5,291,034 A * | 3/1994 | Allam et al. | .................... | 257/17 |
| 7,612,629 B2 * | 11/2009 | Pepper | ............................ | 333/20 |
| 7,715,677 B2 * | 5/2010 | Helmy | ......................... | 385/131 |
| 2005/0242287 A1 | 11/2005 | Hakimi | | |

OTHER PUBLICATIONS

Ong, D.S.; Hartnagel, H., Semiconductor Science and Technology, 2007, vol. 22, pp. 981-987(7).
Belkin, M. A. et al., Nature Photonics, 2007, vol. 1, pp. 288-292.

* cited by examiner

*Primary Examiner* — Levi Gannon

(57) ABSTRACT

A nonlinear solid-state device useful for frequency conversion of electromagnetic radiation and in particular for harmonic generation, comprising a waveguiding electromagnetically distributed structure (WEDS) which includes monolithically a synthetic nonlinear material (SNM). Input radiation coupled into the WEDS is converted into a higher frequency output radiation through a constricted oscillatory motion of charge carriers and phase matched harmonic frequency generation of radiation which builds up coherently over an interaction length many time larger than the radiation wavelengths. In one embodiment, microwave radiation is converted into terahertz radiation. In other embodiments, SNM based WEDS devices are adapted for frequency mixing and parametric oscillation.

19 Claims, 15 Drawing Sheets

SOLID STATE TERAHERTZ RADIATION FREQUENCY MULTIPLIER

CROSS REFERENCE TO RELATED APPLICATIONS

This application claims priority from U.S. Provisional Patent Application No. 61/099,592 titled "Nonlinear-optics Metamaterial Device for Terahertz Applications" and filed Sep. 24, 2008, which is incorporated herein by reference in its entirety.

FIELD OF THE INVENTION

The invention relates in general to radiation converters and in particular to solid state terahertz (THz) frequency multipliers, mixers and sources.

BACKGROUND OF THE INVENTION

The terahertz (THz) region is defined as electromagnetic (EM) radiation between frequencies of 100 GHz and 10 THz, corresponding to a wavelength range of 3 mm-0.03 mm. Interest in the THz region has been sparked by significant progress in the field of THz radiation detectors made in recent years. THz technologies have been applied in materials science, biology, biomedicine, medical spectroscopy, radar, communication systems and homeland security. However, while detectors are available, the most serious obstacle to the study and widespread use of THz applications is the lack of a reliable, tunable, solid state radiation source.

Frequency mixing is the nonlinear generation of the sum or difference between two radiation frequencies in a nonlinear medium. A special case is harmonic frequency generation, where the frequency of an intense single frequency radiation wave is doubled, tripled, quadrupled etc. In harmonic frequency generation, the nonlinear medium converts input radiation of a given wavelength $\lambda_0$ to one of its harmonic wavelengths, such as $\lambda_0/2$, $\lambda_0/3$, $\lambda_0/4$, etc. Harmonic frequency generation has been achieved in the optical region (e.g. by converting Nd-YAG laser radiation from $\lambda=1.06$ μm to $\lambda=0.53$ μm, $\lambda=0.265$ μm, etc.) using nonlinear crystals. Such a crystal is many optical wavelengths long (e.g. 1 cm), but if the generated radiation is phase matched (e.g. by quasi-phase-matching) to the pump laser wave, the harmonic wave grows constructively and coherently along the entire length of the crystal. We refer to this as frequency multiplication in an "EM distributed structure". In the microwave region, e.g. at 10-100 GHz or $\lambda=1$-100 mm, harmonic frequency generation and mixing is usually achieved using discrete elements with dimensions smaller than a wavelength. This is done exemplarily using devices such as Schottky diodes, varactor diodes or, as recently proposed by Ong and Hartnagel (Semiconductor Science and Technology, Vol. 22 (2007) 981-987), quasi-ballistic electron reflection semiconductor devices. Such devices are "lumped" EM elements. Lumped EM elements do not require careful phase matching between the fundamental frequency input wave and the generated harmonic waves (as done in EM distributed structures). However, their power handling is limited to generation of harmonic powers below tens of milliwatts and their conversion efficiency is limited.

An integrated THz source has been suggested recently by Belkin, M. A. et al., *Nature Photonics* 1, 288-292 (2007). THz radiation is generated by mixing two separate mid-infrared frequencies within a semiconductor chip which includes two mid-infrared quantum cascade lasers (QCLs), forming a monolithically integrated structure. The source generates radiation at 60 μm (i.e. at about 5 THz), and can be tuned (by changing the output wavelength of one of the lasers). A major disadvantage of this source is that, at present, it only offers an estimated 100 nW of power when operated at 80K—far too small for most of the applications envisaged for the THz spectral range. This compares with the more than 10 mW of power commonly achieved in terahertz QCLs operating at cryogenic temperatures.

Another type of THz radiation source has been suggested by Hakimi in US Patent Application 2005/0242287A1. This source is based on radiative power conversion from a high frequency light source (laser) to THz radiation by means of a nonlinear frequency down-conversion process (Stimulated Raman Scattering (SRS) of Self Phase Modulation (SPM)). The down-conversion occurs in a polar material within a dielectric (core) optical waveguide. The dielectric guides the laser beam and the frequency-downshifted (Stokes) optical wave. The natural nonlinear material supports some solid state elementary excitation of discrete frequency (phonon, polariton, exciton, magnon or a quantum well level). The interaction of the two optical frequency waves (the pump and the Stokes wave) generates radiation at the beat frequency in the frequency range of the elementary excitation, which happens to be in the THz regime. This radiation is thus generated at the THz frequency range and is guided by a THz waveguide.

SUMMARY OF THE INVENTION

In this invention, "medium" and "material" are used interchangeably. Further, "synthetic nonlinear medium" (SNM), "artificial nonlinear medium" and "nonlinear metamaterial" are also used interchangeably. In this invention, a "waveguiding electromagnetically distributed structure" (WEDS) is a distributed interaction element which can incorporate monolithically an array or aggregate of nonlinear microstructures which on the macro (radiation wave length) scale form a SNM.

Under pumping by input radiation of a given frequency, the nonlinear microstructures radiate in phase coherently and constructively with each other, while the radiation field generated therefrom builds up coherently along an interaction length. The radiation field is generated at a higher (than the input) frequency and produces output radiation. In some embodiments, the interaction length is essentially the WEDS length. In some embodiments, the interaction length equals the SNM length, which may be equal or somewhat smaller than the WEDS length. The interaction length may be much longer than the radiation wavelengths. A SNM based WEDS device of the invention (also referred to as a "SNM-WEDS device") operates therefore in a way similar to an optical frequency multiplier based on a natural nonlinear crystal. However, in contrast with nonlinear-optics devices relying on the natural nonlinear coefficients of crystalline materials, which are very inefficient at THz frequencies, a SNM-WEDS device can be very efficient in the THz regime, since it can be engineered to have very high nonlinear coefficients and high transparency at any desirable wavelength. At the same time, in contrast with lumped EM element-based microwave harmonic generation and mixing devices, a SNM-WEDS device can be constructed monolithically, to provide, by phase-matched coherent interaction of the pump and harmonic waves, distributed cumulative coherent harmonic power generation at long interaction lengths (millimeters or centimeters long), thus producing high power levels and higher power conversion efficiencies. Herein, "monolithically" refers to a continuous structure (which forms essentially a synthetic material) in which phase matching is performed globally for all microstructures and in which there is no need of accurate positioning of discrete elements relative to each other.

In contrast with Hakimi (US Patent Application 2005/0242287A1), a SNM-WEDS device is based on a nonlinear frequency up-conversion process, not on a nonlinear frequency down-conversion process. Further in contrast with Hakimi, a SNM-WEDS device used for THz generation is not based on the existence of, and is not in the frequency range of some elementary excitations in a polar material. A SNM-WEDS device needs only a low frequency source for operation (e.g. a Klystron), and its generated harmonic operating frequency depends only on this source. The SNM in a SNM-WEDS device can be designed to exhibit desirable, highly efficient nonlinear harmonic response to low frequency pumping. Its nonlinear interaction principle is based on free charge carriers which are constricted in their motion by a constricting microstructure. This is in contrast with Hakimi's device, in which free carriers would be undesirable and would only contribute to absorption losses.

With present state of the art of technology, SNM-WEDS devices disclosed herein can be constructed for high power harmonic frequency generation as well as for frequency mixing applications in the THz regime (0.1 to 10 THz) using as input microwave or mm-wave intense radiation sources.

In an embodiment, there is provided a device comprising a WEDS which includes monolithically a SNM, wherein the WEDS has an interaction length and wherein the SNM is operative to up-convert input microwave or mm-wave radiation into higher frequency output radiation in a coherent, phase-matched way along the interaction length and wherein the higher frequency is a higher harmonic of the input frequency.

In an embodiment, the device further comprises a conductive (e.g. metallic) radiation bounding element surrounding the SNM at least partially.

In an embodiment, the radiation bounding element is a hollow waveguide.

In an embodiment, the SNM includes charge carriers which are induced to perform a constricted oscillatory motion induced by the input radiation.

In an embodiment, the SNM further includes a constricting structure, which constricts the charge carrier oscillatory motion.

In an embodiment, the higher frequency is an odd multiple of the input frequency.

In an embodiment, the higher frequency is an even multiple of the input frequency.

In an embodiment, the constricting structure is a layered structure.

In an embodiment, the constricting structure is a potential well which constricts the oscillatory motion in the direction of a polarization component of the input radiation.

In an embodiment, the SNM further includes a plurality of constricting structures embedded in a matrix, wherein at least some of the constricting structures constrict the charge carrier oscillatory motion in the direction of a polarization component of the input radiation.

In an embodiment, the constricting structures are 3-dimensional potential well structures.

In an embodiment, there is provided a device comprising a waveguiding electromagnetically distributed structure which includes monolithically a synthetic nonlinear material, wherein the WEDS has an interaction length and wherein the SNM is operative to convert input microwave or mm-wave radiation of a first frequency and of a second frequency into a mixed frequency output radiation of a third, higher frequency in a coherent, phase-matched way along the interaction length.

In an embodiment, there is provided a method for generating terahertz radiation comprising the steps of providing a WEDS which includes monolithically a synthetic SNM, wherein the WEDS has an interaction length, inputting microwave or mm-wave radiation into the WEDS and using the SNM to up-convert the input microwave or mm-wave radiation into higher frequency output radiation in a coherent, phase-matched way along the interaction length, wherein the higher frequency is a higher harmonic of the input frequency

BRIEF DESCRIPTION OF THE DRAWINGS

The invention is described herein, by way of example only, with reference to the accompanying drawing, wherein.

DETAILED DESCRIPTION OF THE INVENTION

Figure 1:
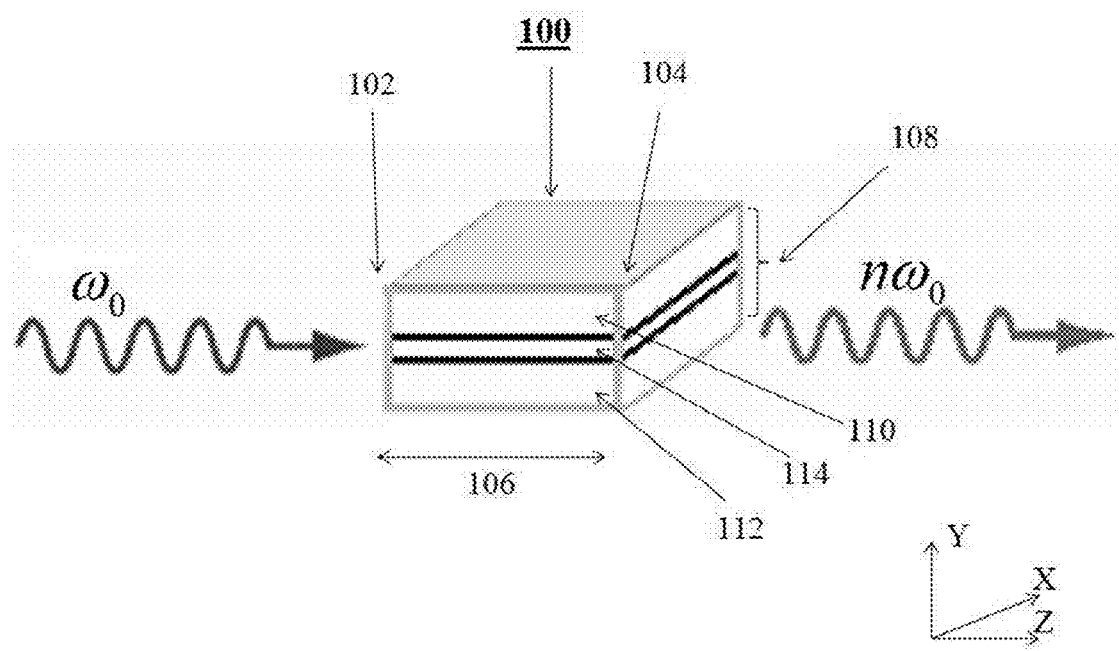
FIG. 1 shows an embodiment of a SNM-WEDS device according to the invention.
Figure 2:
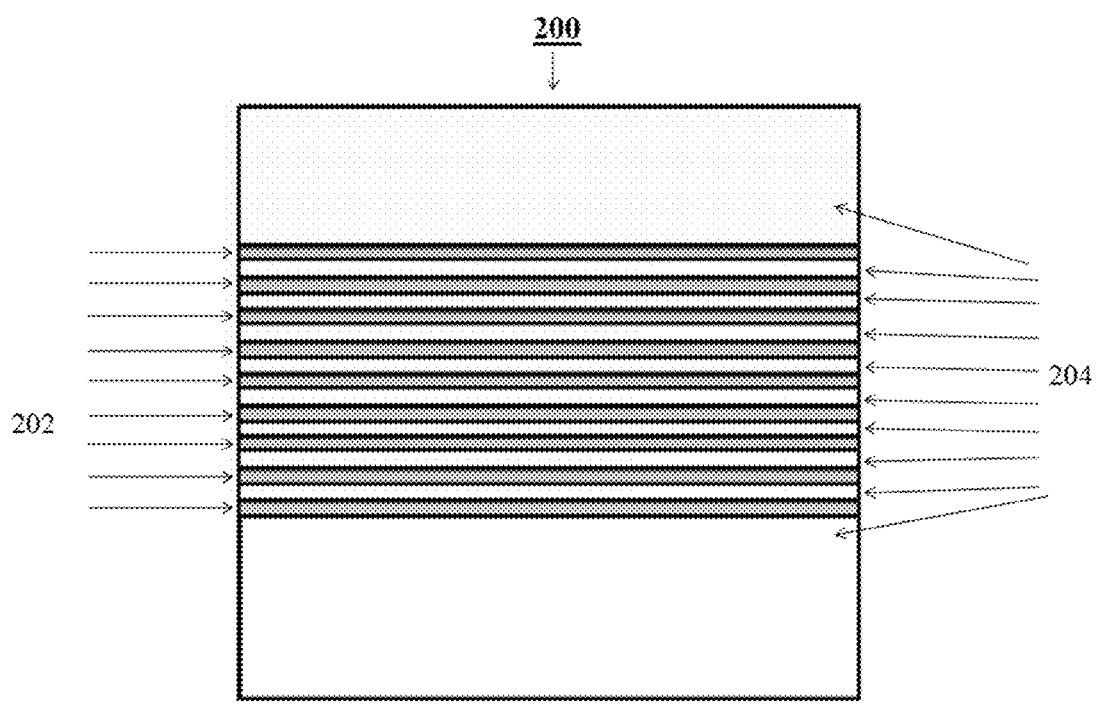
FIG. 2 shows an embodiment of a device having a multilayer structure of high bandgap/low bandgap materials which form a SNM-WEDS device according to the invention.

FIGS. 1-3 show an embodiment of a SNM-WEDS device of the invention and its principle of operation. As shown in FIG. 1, the device includes a waveguiding electromagnetically distributed structure 100 having an entrance plane 102 and an exit plane 104, with a device length 106 extending along a Z axis between planes 102 and 104. WEDS 100 includes a synthetic nonlinear material 108 which has a layered structure in which two external, constricting layers 110 and 112 sandwich therebetween a third, center layer 114. In one embodiment, the SNM includes two semiconductor materials with different band gaps which form a potential well (also referred to herein as "active region") in center layer 114. In order to avoid undesirable free carrier absorption losses, the thickness of the potential well (marked "D"), or of the region within the well next to a barrier in which there are free charge carriers, should not be much longer than a pre-designed amplitude $\Delta Y_e (\omega_0)$ of the carriers in response to a pump (also referred to as "fundamental" and "first") frequency $\omega_0$ (see eq. 3). The lower limit of D ($D_{min}$) is a free design parameter and depends on the pump power, the desirable harmonic radiation, the semiconductor collision time parameter and the attainable charge density. For low harmonics (say n=2 or 3), $D_{min}$ may be exemplarily $\Delta Y_e(\omega_0)/2$. For higher harmonics, $D_{min}$ may be exemplarily $\Delta Y_e(\omega_0)/4$.

In one embodiment, constricting layers 110 and 112 may be made of AlGaAs and center layer 114 may be made of GaAs. In another embodiment, constricting layers 110 and 112 may be made of InAlAs and center layer 114 may be made of InGaAs. In some embodiments, multiple potential wells may be provided by a multilayer structure of alternating high bandgap materials 202/low bandgap materials 204, an example of which is shown in FIG. 2. Preferably, in order not to limit the number of free charge carriers (electrons or holes), the potential well should not be a quantum well.

Figure 3A:
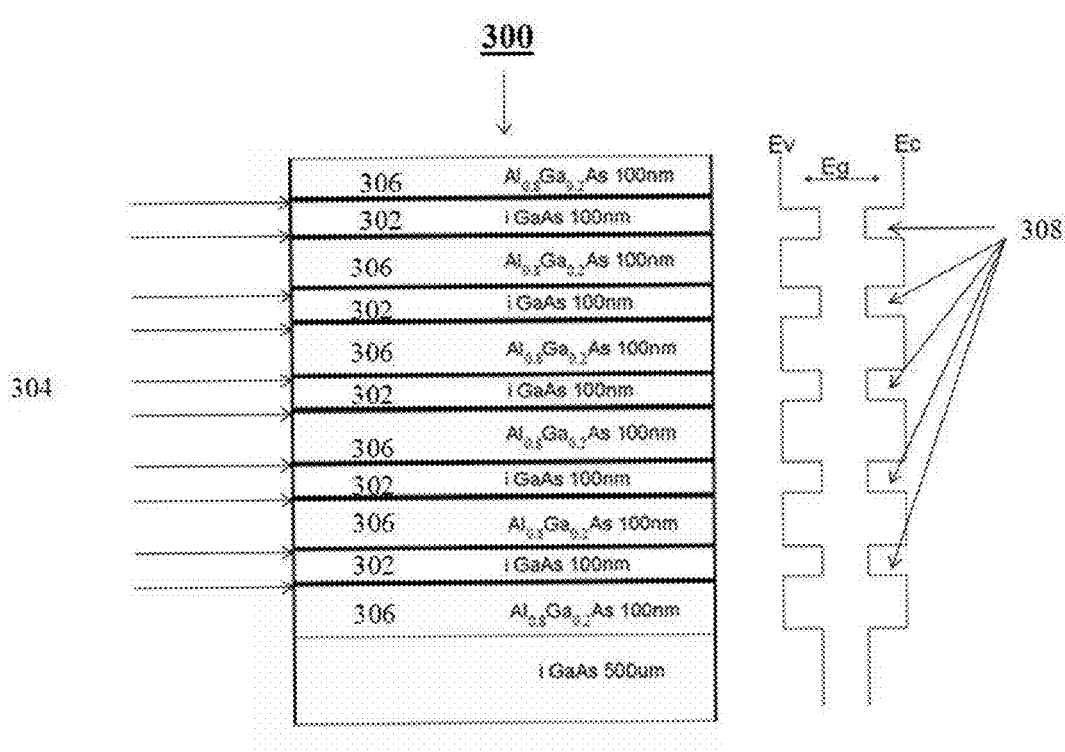
FIG. 3A shows a fabricated multilayer GaAs/AlGaAs SNM-WEDS device according to the invention.

Charge carriers may be introduced into the potential well in well known ways. For example, as shown in FIG. 3A, multi-layer structures may be grown with undoped low bandgap layers (in the example GaAs layers 302), with charge carriers being provided by a single or double "delta doping" layer 304 grown in the high bandgap layers (in the example AlGaAs layers 306). Such a structure has the advantage that the charge carriers originate from the delta doped barrier layers and diffuse into the intrinsic, high mobility, long collision time active regions where they are "trapped". The physics of multilayer potential structures and the charge carrier concentration in such potential wells 308 as function of growth and doping conditions are well known in the art. The invention is described further with specific reference to electrons, but applies equally well to holes.

Figure 3B:
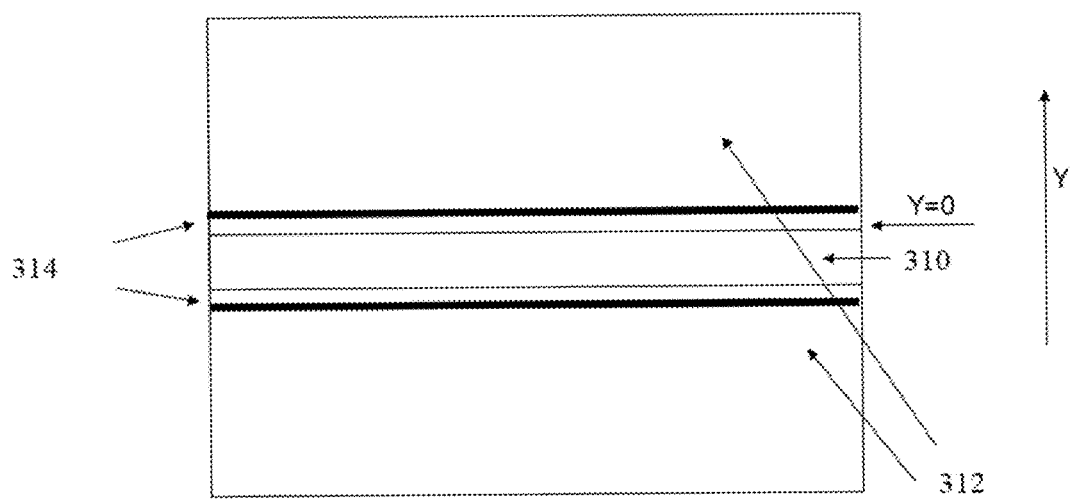
FIG. 3B shows an embodiment of a single active layer symmetric GaAs/AlGaAs SNM-WEDS device according to the invention.
Figure 3C:
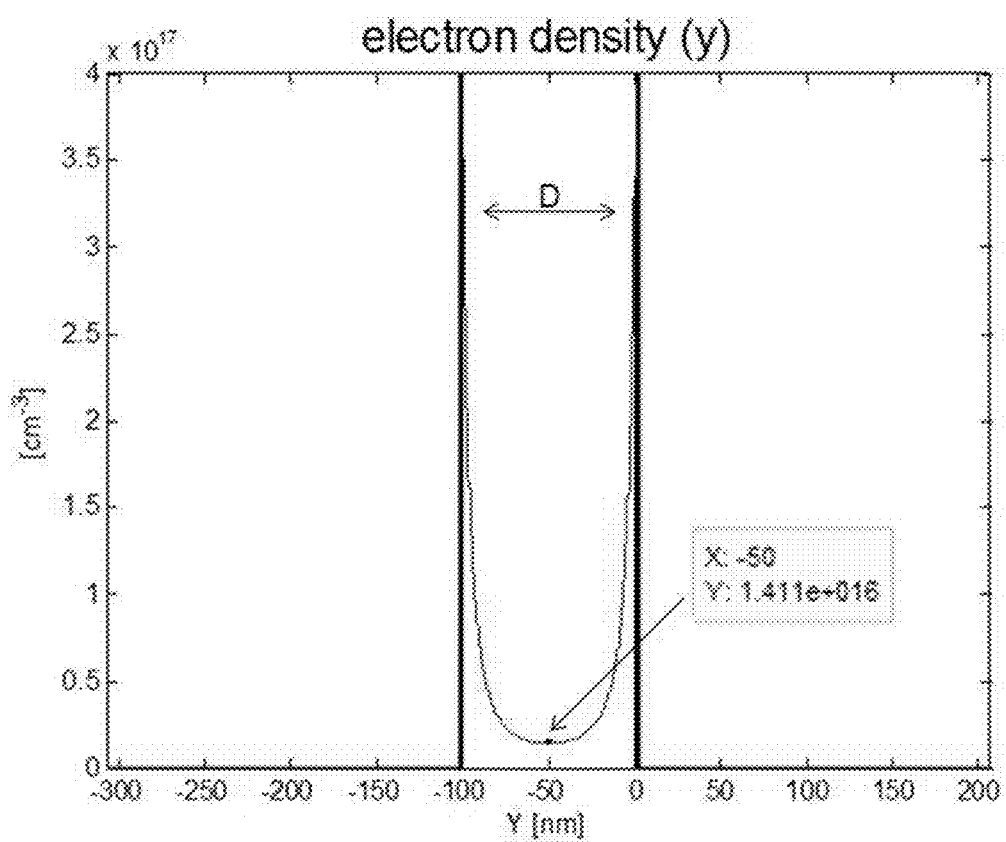
FIG. 3C shows calculated charge carrier distributions in an active layer (potential well) of the device portrayed in FIG. 3B.

FIG. 3B shows an exemplary single active layer embodiment of a symmetric SNM-WEDS, implemented with a 100 nm i-GaAs layer 310 sandwiched between 200 nm $Al_{0.8}Ga_{0.2}As$ layers 312 and with symmetric $0.5*10^{10}$ cm$^{-2}$ delta doping layers 314 to provide the charge carriers. The active layer (well) boundaries are shown by bold lines at −100 nm and 0 nm. FIG. 3C shows calculated charge carrier distributions in a single i-GaAs layer 310. The concentration is higher near the edges of the well.

Figure 3D:
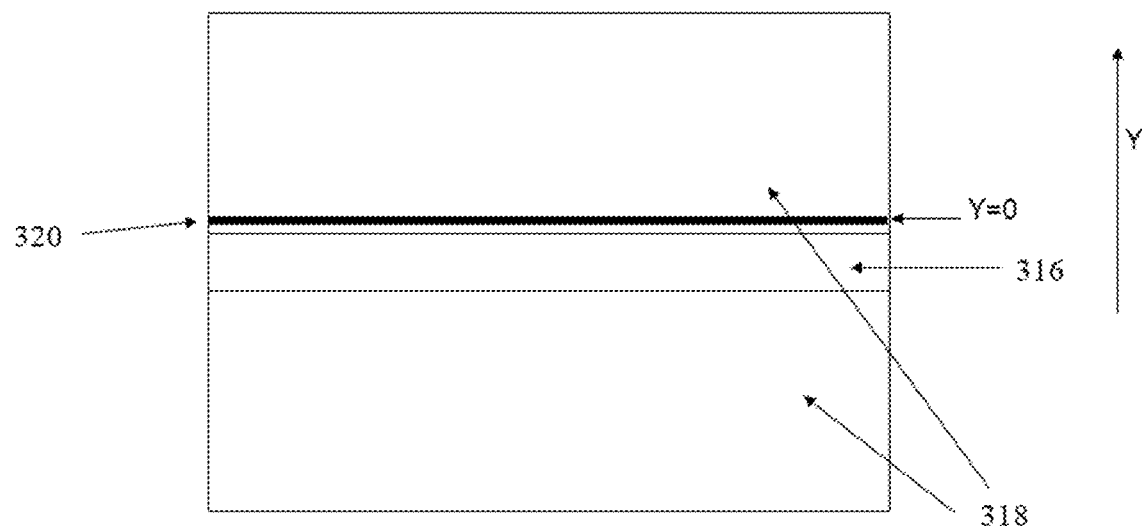
FIG. 3D shows an embodiment of a single active layer asymmetric GaAs/AlGaAs SNM-WEDS device according to the invention.
Figure 3E:
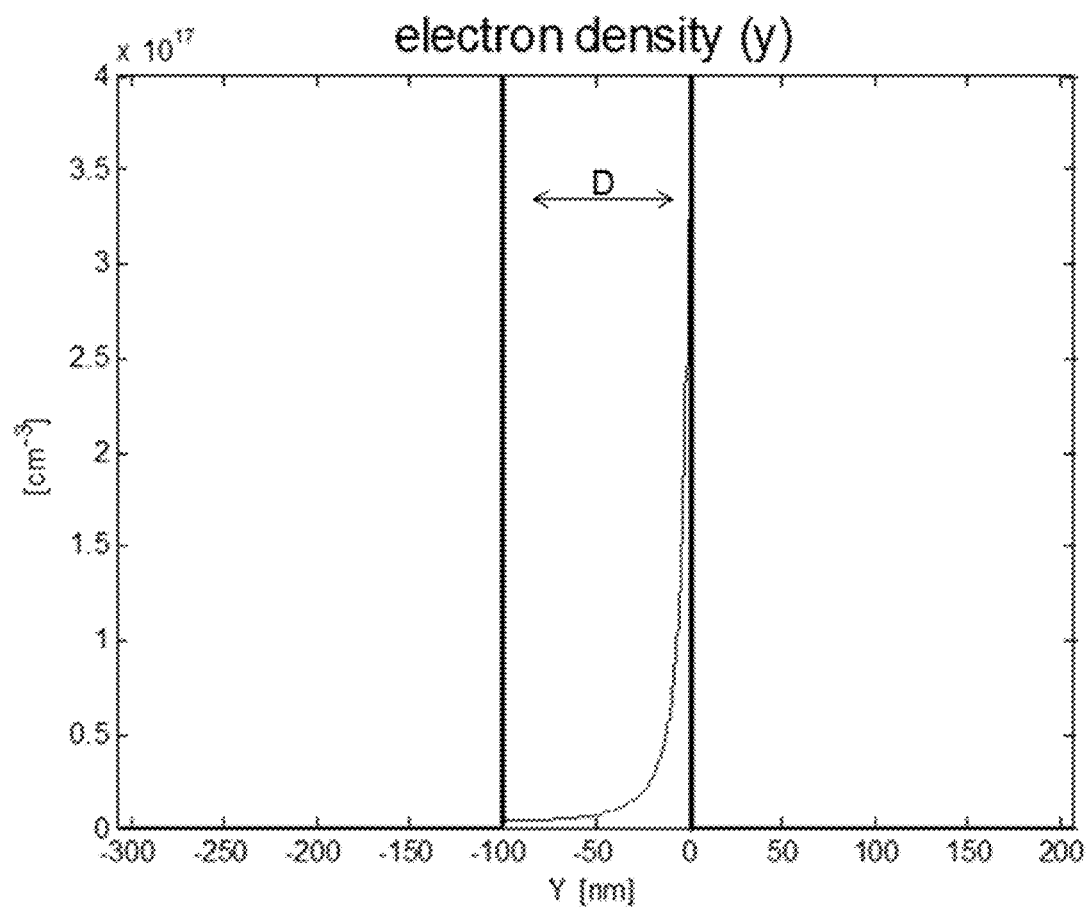
FIG. 3E shows calculated charge carrier distributions in a single asymmetrical active layer of the device portrayed in FIG. 3D.

FIG. 3D shows an exemplary single active layer embodiment of an asymmetric SNM-WEDS, implemented with 100 nm i-GaAs layer 316 sandwiched between 200 nm $Al_{0.8}Ga_{0.2}As$ layers 318 and a single $0.5*10^{10}$ cm$^{-2}$ delta doping layer 320 to provide the charge carriers. FIG. 3E shows calculated charge carrier distributions in a single asymmetrical i-GaAs layer 316. The concentration is higher near the edge close to the delta doping layer.

Figure 4:
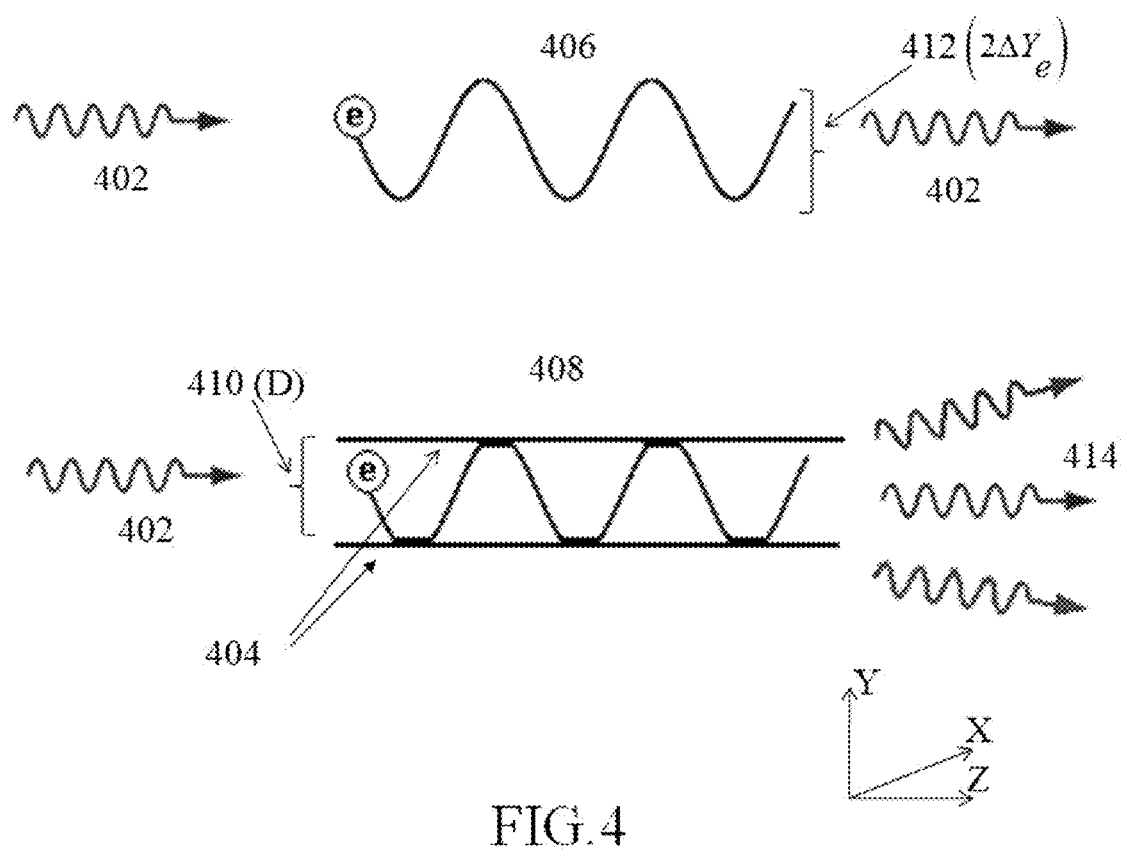
FIG. 4 shows schematically the operation of a device according to the invention.

In operation, as shown in FIG. 4, EM radiation of a first, "fundamental" frequency $\omega_0$ (402) is coupled into the WEDS through the input plane and propagates along the Z axis. The EM field has a polarization component in a direction transverse to Z and to the interfaces between the SNM layers 404 (i.e. in direction Y). Free electrons in the potential well 410 oscillate in a periodic way at the same fundamental frequency in response to a fundamental radiation field 406. The behavior of the oscillating free electrons is described below using the classical Lorentz dipole model. The movement of the electrons is constricted spatially by potential barriers 408. If the width of the potential well D is not much larger than the amplitude of the unperturbed transverse oscillation 412 of the electrons $\Delta Y_e$ (see eq. 3 below), then most of the electrons in the well experience the restricting force of the barrier, and their oscillation trajectories are not sinusoidal (but still periodic). That is, the confinement leads to charge oscillations at harmonic frequencies of the periodic trajectories and to corresponding radiation emission 414 at these harmonic frequencies. The harmonics generated are odd (i.e. n=3, 5, etc. where "n" is the harmonics number) for symmetrical barriers, or even (i.e. n=2, 4, etc.) for asymmetrical barriers. In the specific examples in FIGS. 1-3, the barriers are symmetrical and the main harmonic generated would be the third harmonic.

The constricted oscillatory motion builds up a radiation field at a harmonic frequency $\omega_n=n\omega_0$ coherently and constructively over device interaction length 106, which is normally many times greater than the radiating wavelengths. The build-up results in an intense coherent output EM radiation wave at the harmonic frequency $\omega_n$. This is one expression of the "EM distributed" aspect of a SNM-WEDS device. The coherent and constructive buildup of the radiation is similar to the one occurring in optical nonlinear crystals but is applied here inventively to a THz-range SNM based WEDS device. In an exemplary embodiment using symmetrical potential wells, the input radiation is microwave radiation having a fundamental frequency in the mm-wave range, and the output radiation has a third harmonic (n=3) frequency in the THz range. This provides a new and novel type of solid state THz source. In multilayer embodiments, for the same pump power coupled into the device, the harmonic conversion efficiency and power generation will increase in proportion to the number of layers squared (because of their coherent constructive emission) and in proportion to the interaction length squared (for the same reason). This scaling is correct as long as the device operates in the non-depleted pump operating regime and as long as the harmonic wave does not get out of phase relative to the harmonic polarization wave generated by the pump. However, for long interaction lengths, it is possible to maintain the quadratic growth of the power with length by phase matching techniques described below. Furthermore, as known in the art of nonlinear optics, the conversion efficiency can continue to grow with length even beyond the non-depleted pump operating range. Thus, conversion efficiencies of many tens of percent are theoretically possible.

Figure 5:
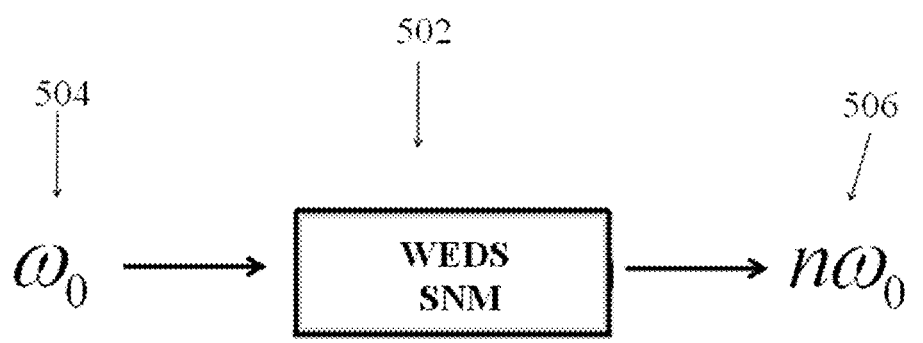
FIG. 5 shows schematically a packaged device according to the invention having as input radiation from the pump and as output harmonic frequency THz radiation.

Optimal power conversion efficiency can be numerically calculated for various designs, doping concentrations and input power levels. Note that a device of the invention requires no additional power input other than the coupled-in radiation in order to operate properly, FIG. 5 shows schematically a packaged SNM-WEDS device 502 having as input radiation provided by a microwave source acting as pump 504 and having as output higher frequency THz radiation 506.

Quasi-Phase Matching

Figure 6:
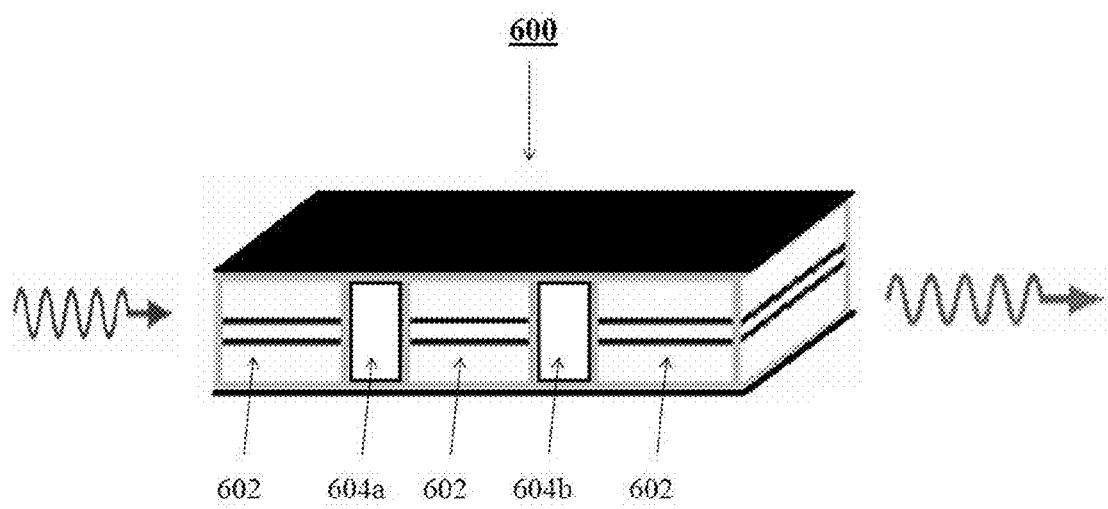
FIG. 6 shows an embodiment of a SNM-WEDS device of the invention having segments and incorporating phase shifters.

To attain high conversion efficiency, a SNM-WEDS device may include a number of segments each having a coherence length (the length where the harmonic radiation and the polarization waves get out of phase—$\Lambda/2$ in eq. 21) positioned in sequence along the wave propagation direction with properly impedance-matched phase shifters placed in-between the segments. An embodiment 600 of a SNM-WEDS device having segments 602 and incorporating phase shifters 604a and 604b is shown in FIG. 6. The phase shifters may be just dielectrically filled waveguiding sections of proper length, which re-match the relative phase of the radiation and of the polarization harmonic waves for continued coherent constructive harmonic generation. Alternatively, the quasi-phase matched device can be made from one single crystal multi-layered segment in which the nonlinear layers are modulated periodically in the z direction with a period equal to the phase coherence length (Eq. 21). This can be done by leaving periodic un-doped regions along the structure or removing them after growth. In even harmonic generation with an anti-symmetric SNM component, the phase matching can be provided by rotating the SNM segments by 180° around the Z axis relative to each other. In the non-depleted pump limit, the conversion efficiency of the phase-matched device will continue to increase as the number of sequenced segments squared.

Additional Embodiments

Figure 7:
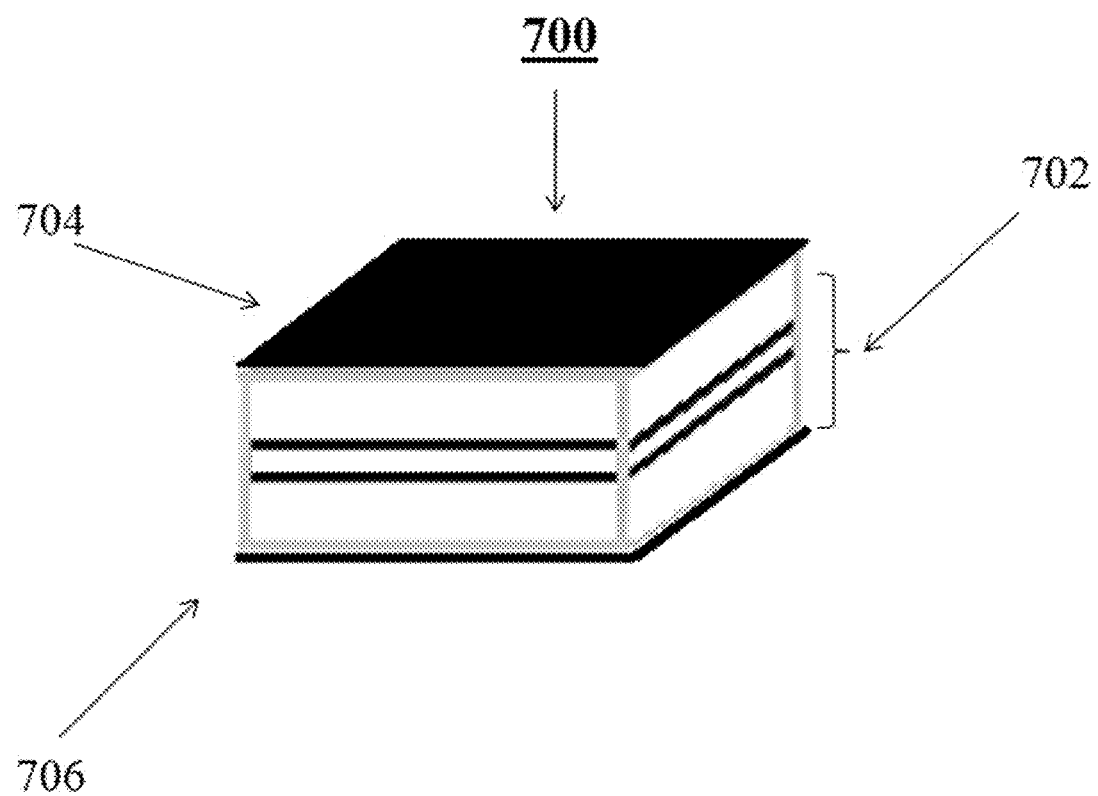
FIG. 7 shows an embodiment of a device of the invention, wherein the SNM-WEDS is bound by two parallel conducting waveguide plates.

FIG. 7 shows an embodiment 700 of a SNM-WEDS device, wherein a SNM 702 is bound by two parallel conductive waveguide plates 704 and 706. These plates keep the pump and generated waves confined (non-diffracting) in discrete radiation transverse modes which are pre-designed to phase-match in the propagation dimension (Z).

Figure 8:
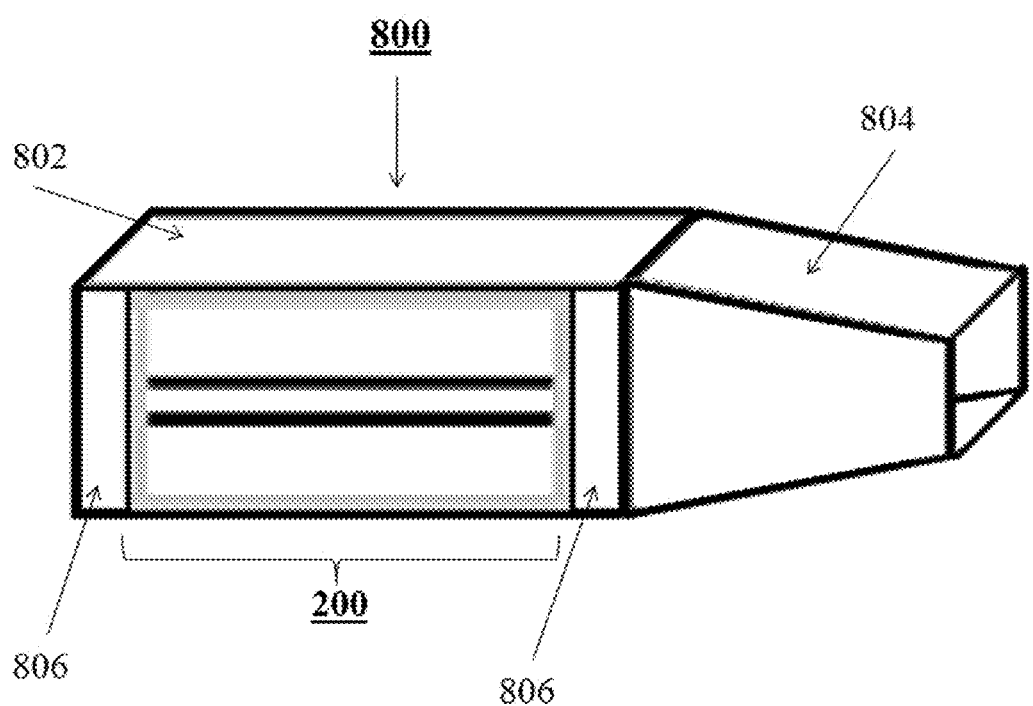
FIG. 8 shows an embodiment of a SNM-WEDS device of the invention, wherein a SNM is positioned in a standard rectangular waveguide followed by a tapered mode exciter matched to a higher frequency (THz) waveguide.

FIG. 8 shows an embodiment 800 of a device of the invention, wherein a SNM 200 is positioned in a standard rectangular waveguide 802 followed by a tapered mode exciter matched to a higher frequency (THz) waveguide. In a particular example, for use as a THZ source based on in-coupled mm-wave radiation in the W-band (90-110 GHz) the device is enclosed in a section of a WR-10 standard rectangular waveguide. The coupling out of the SNM-WEDS device into a standard WR-3 waveguide (for band 220-320 GHz) is made by means of a tapered mode exciter 804. The exciter couples efficiently the harmonic radiation mode generated in the (over-moded) WR-10 structure to the $TE_{01}$ mode of a WR-3 waveguide. Impedance matching components, such as quarter-wavelength plates 806, are positioned on both sides of the WR-10 waveguide in order to couple efficiently the pump wave into the device and the harmonic wave out of it.

Figure 9:
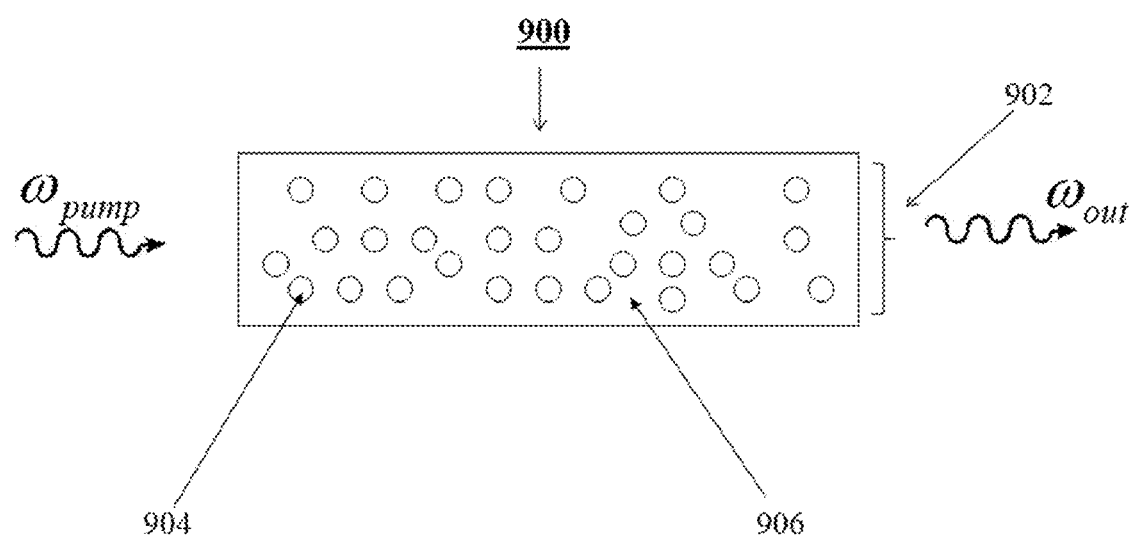
FIG. 9 shows schematically yet another embodiment of a SNM-WEDS device according to the invention, the device having 3-dimensional potential well microstructures.

FIG. 9 shows schematically yet another embodiment 900 of a SNM-WEDS device according to the invention. The SNM-WEDS device includes a SNM 902 which has 3-dimensional potential well structures 904 embedded in a matrix 906. Matrix 906 may be made of a material transparent at all the radiation frequencies involved. Various THz-transparent materials are known, see for example Hakimi 2005/0242287A1. They include semiconductors (e.g. intrinsic GaAs), insulators (e.g. fused quartz) and polymers (e.g. polyethylene). In an embodiment, embedded structures 904 may be of a semiconductor phase having free charge carriers. Structures 904 may be sized such as to restrict the oscillation of the free charge carriers in at least one dimension (i.e. in the direction in which the pump radiation wave has a polarization component). For example, the potential well may be larger than a quantum dot but smaller than the designed oscillation amplitude $\Delta Y_e$ of the charge carriers in response to the pump wave field (eq. 3). In some embodiments, SNM 902 may be in a single bulk form. In some embodiments, the SNM-WEDS device may include a number of SNM 902 segments, each segment having a coherence length situated in sequence along the wave propagation direction, with properly impedance-matched phase shifters placed in-between the segments (as in FIG. 6). In some embodiments, SNM 902 may be bound by two parallel conductive waveguide plates (as in FIG. 7). In some embodiments, SNM 902 may be positioned in a hollow rectangular waveguide as in FIG. 8.

Frequency Mixing

Figure 10:
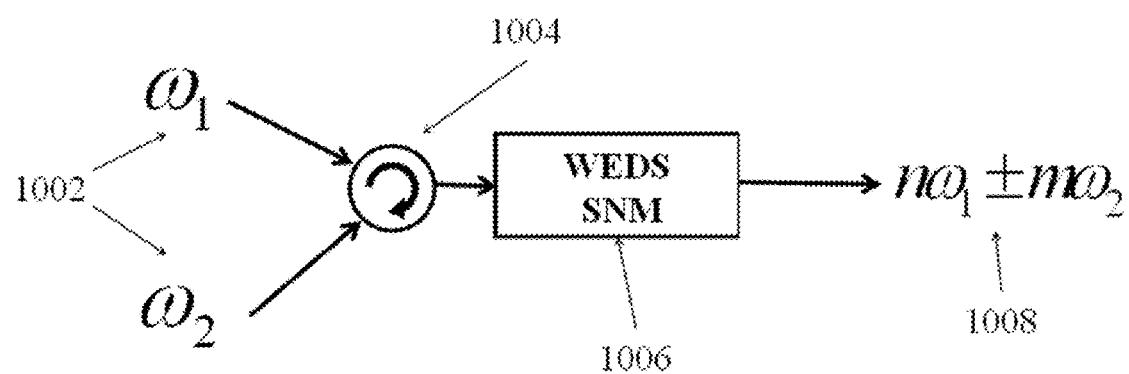
FIG. 10 shows schematically a SNM-WEDS in a frequency mixing system.

As in conventional nonlinear optics, a SNM-WEDS device of the invention may also be used for frequency mixing, frequency modulation, parametric amplification and parametric oscillation. All of these schemes require at least one intense input wave (pump) in the microwave, mm-wave or THz frequency regimes. These applications of the device require insertion of two waves (e.g. by using circulators) of frequencies $\omega_1$, $\omega_2$. A nonlinear parametric process in a SNM-WEDS device based on constricted motion of free charge carriers can generate intense coherent output radiation at frequencies $n\omega_1 \pm m\omega_2$ (n, m being positive or negative integers), as shown in FIG. 10. In the case of a parametric amplifier, a mixed frequency wave 1002 is inserted into the device 1004, and emerges amplified in one of its ends 1006. In the case of a parametric oscillator, feedback is provided by end reflections (not shown) or by other means, the mixed frequency wave grows spontaneously to saturation, and then the device operates as an oscillator.

As in the case of harmonic generators, the condition for obtaining efficient devices of this kind is that the dimensions of the constricting structure or the charge carrier region be not much larger than the amplitude of charge oscillation at the frequency of the pump $\Delta Y_e(\omega_0)$. The state of the art in micro and nano-fabrication makes it possible to fabricate such devices in the THz regime.

Physical Model

The conventions used in the model below are: "underline" designates a vector (A), "top line" designates normalization by D ($\overline{A}$), top "~" designates a complex phasor ($\tilde{A}$) and top dot designates a time derivation ($\dot{A}$). The following notations are used.

$\lambda_0$ external radiation source (pump) wavelength in vacuum
$y_e(t)$ free electron location along the y axis
$y_0$ free electron mean location along the y axis
$\Delta Y_e(r_0, \omega_0)$ non-constricted oscillation amplitude along the y axis (also $\Delta Y_e$)
$\omega_0$ non-constricted electron frequency of movement
t time
$\phi_e$ free electron movement relative phase
m* effective free electron mass
γ Drude drag coefficient (collision rate)
$\tau_C$ collision time=1/γ
e electron charge
$E_{(r_0)}^\omega$ external electric field of frequency ω at location $r_0$
$n_e$ electron density in active layer
$D_{active}$ active layer width (also D)
$D_{bulk}$ inactive layer width
$y_C(t)$ constricted free electron location along the y axis
$\overline{\Delta Y}_e$ free oscillation amplitude normalized by D
$\overline{y}_C(t)$ constricted free electron location along the y axis normalized by D
t' phase invariant time
$S(r_0)$ power density at location $r_0$
$Z_q^\omega$ mode impedance
$A_m$ amplitude of the $m_{th}$ harmonic component of constricted electron motion
$y_{cm}$ constrained electron motion $m_{th}$ order exp' component
$\overline{A}_m$ $A_m$ normalized by D
$P_{SNM(r_0, t)}$ synthetic polarization density of carriers within the potential well, also $P_{(r_0, t)}$
$\tilde{P}_m$ polarization $m_{th}$ fourier component $E_q^\omega(x, y, z)$ waveguide $q_{th}$ mode electric field at frequency $\omega$
$\overline{C}_q^\omega(z)$ field amplitude of the waveguide $q_{th}$ mode at frequency $\omega$
$R_m$ integration of $A_m$ over the potential well (active layer)
$\in_q^\omega(x, y)$ waveguide $q_{th}$ mode transverse field profile at frequency $\omega$
$k_q^\omega$ $q_{th}$ mode wave number at frequency $\omega$
$P_q^\omega$ mode normalization power
$A(z)$ waveguide cross-section
$\tilde{J}$ effective current flux source within the waveguide
$\tilde{J}^{n\omega}$ effective current flux source $m_{th}$ order exp' component
$\overline{\Lambda}$ phase matching cycle length (coherence length)
$\Lambda_2$ length of positive part of the $n_e(z)$ phase matching cycle
$L$ length of waveguide along the z axis
$W_X$ length of waveguide along the x axis
$y_l$ y-axis location of the center of layer $l$ ($l=1, 2, 3 \ldots$)
$\eta$ frequency mixing power conversion efficiency A layered SNM-WEDS device was investigated theoretically and simulated numerically using the following physical model. The model describes the behavior of a GaAs—AlGaAs slab waveguide as in FIG. 1 under strong external microwave radiation. The following assumptions are used for the analytical evaluation:

1) The classical Lorentz polarization model is used to derive the electron response. This model is adequate for the practical parameters of the examples computed below. The free charge carriers are assumed to fill up uniformly the potential well.

2) The Drude formula is assumed to be valid for the calculation of the refraction index for doping concentration of up to $10^{18}$ cm$^{-3}$.

3) The non-depleted pump approximation (NPA) is used in the calculation of power transfer efficiencies. The NPA assumes low power transfer from the external input radiation (pump) to the excited harmonic modes (less than 20%), so that the fundamental harmonic pump wave can be said to have constant power along the Z axis. Higher efficiency is possible in the depleted pump operating regime, as in natural crystal nonlinear optics, but the theoretical analysis requires modification.

4) A slab dielectric parallel plate waveguide (two dimensional structure) model is taken to describe the radiation modes. Some modification would be required to describe interaction in a 3D waveguide of finite width The non-constricted free electron oscillation amplitude ($\Delta Y_e$) and relative motion phase ($\varphi_e$) are calculated using the Linear Lorentz Model.

$$y_e(t) = y_0 + |\Delta Y_e(\underline{r}_0)|\cos(\omega_0 t - \varphi_e) \tag{1}$$

$$m^* \Delta \ddot{y}_e + 2\gamma m^* \Delta \dot{y}_e = -eE_{(\underline{r}_0)}^{\omega_0} \tag{2}$$

$$\Delta Y_e(\underline{r}_0, \omega_0) = \left| \frac{-eE_{(\underline{r}_0)}^{\omega_0}}{m^*(\omega_0^2 + j\omega_0\gamma)} \right| = \frac{e\sqrt{2Z_g S_{(\underline{r}_0)}^\omega}}{m^*\omega_0^2\sqrt{1+\gamma^2/\omega_0^2}}, \tag{3}$$

$$\varphi_e = \arctg\left(\frac{\gamma}{\omega_0}\right) + \varphi_E$$

In order to avoid free carrier absorption losses, it is necessary to keep $\Delta Y_e(\underline{r}_0, \omega_0)$ not much smaller than the potential well width D.

Figure 11:
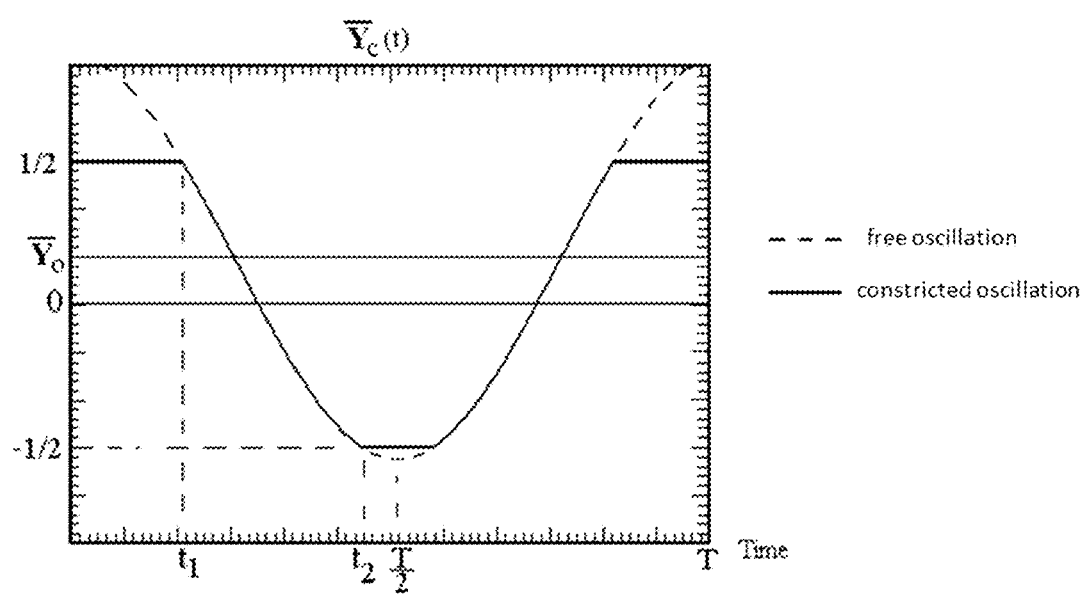
FIG. 11 shows the constricted motion of an oscillating electron in a potential well under the influence of a Y polarization component of the input radiation. The electron center of oscillation is off the center of the well and its motion is constricted asymmetrically in one RF oscillation period $T=1/f$.

When the external signal is strong enough to cause electron oscillations larger than D, the electron's motion becomes constrained (as shown in FIG. 11) thus causing a non-linear effect that causes each electron to radiate a combination of frequencies which are harmonic frequencies of the input radiation. Assume a "steep barrier" model $$y_c(t) = \begin{cases} D/2 & y_e(t) \geq D/2 \\ y_e(t) & \text{Otherwise} \\ -D/2 & y_e(t) \leq -D/2 \end{cases} \tag{4}$$

The constrained electron motion can be described by the summation of harmonic frequencies. By shifting the time variable to a phase invariant system (eq. 5), the motion symmetry can be utilized to exclude the sinusoidal components:

$$t' = t - \frac{\varphi_e}{\omega_0} \Rightarrow y_c(t') \text{ is symmetric such that } y_c(-t') = y_c(t') \tag{5}$$

$$y_c(t') = \frac{A_0}{2} + \sum_{m=1}^{\infty} A_m \cos\{m\omega_0 t'\} \tag{6}$$

$$A_m = \frac{2}{\tau} \int_{-\tau/2}^{\tau/2} y_c(t') \cos(m\omega_0 t') dt', \tau = \frac{2\pi}{\omega_0} \tag{7}$$

$$y_c(t') = \sum_{m=-\infty}^{\infty} y_{cm} e^{-im\omega_0 t'} \tag{8}$$

$$y_{cm} = y_{c-m} = \frac{A_m}{2} \tag{9}$$

The synthetic polarization density of the constricted oscillating carriers can be calculated and separated into harmonic components at each point in the GaAs layer:

$$(P_y)_{SNM}(\underline{r}_0, t) = -e \cdot n_e \cdot y_c(\underline{r}_0, t') = \sum_{m=-\infty}^{\infty} \tilde{P}_m e^{-im\omega_0 t'} \tag{10}$$

$$\tilde{P}_m = -e \cdot n_e \cdot \frac{A_m}{2} e^{im\varphi_e} \tag{11}$$

The waveguide electric field modes ($\tilde{E}_q^{\omega_0}(x, y, z)$) can be calculated numerically. These waveguide modes are a function of the waveguide geometry and the radiation frequency. The electric field at any cross section (at a specific Z location), can be expressed as the sum of these modes:

$$\tilde{E}_{(x,y)}^{t\omega}|_z = \sum_{q=1}^{\infty} C_q^\omega(z) \cdot \tilde{E}_q^{t\omega}(x, y, z) \tag{12}$$

$$\tilde{E}_q^{t\omega}(x, y, z) = \varepsilon_{q(x,y)}^\omega \cdot e^{jk_q^\omega z} \tag{13}$$

The calculated polarization components are treated as radiative sources that excite harmonic modes in the waveguide. The excited mode amplitudes $C_q^\omega(z)$ can be calculated along the Z axis from:

$$\frac{dC_q^\omega}{dZ}\bigg|_z = \frac{-1}{4P_q^\omega} \int\int (\underline{J}^\omega(\underline{r}_0) \cdot \underline{\tilde{E}}_q^*) \cdot dx \cdot dy \tag{14}$$

$$\underline{J}(\underline{r}_0, t) = \frac{d}{dt} P_{SNM}(\underline{r}_0, t) = \sum_{m=-\infty}^{\infty} \underline{\tilde{J}}^{m\omega}(\underline{r}_0) \cdot e^{-im\omega t} \tag{15}$$

-continued $$\tilde{J}_j^{m\omega_0}(\underline{r}_0) = i \cdot (m \cdot \omega_0) \cdot e \cdot n_e(\underline{r}_0) \cdot \frac{A_m(\underline{r}_0)}{2} \cdot e^{im\varphi_e} \qquad (16)$$

$P_q^\omega$ (eq. 14) is the normalized power of the mode q. The mode amplitude excitation equation (14) can be presented in term of the harmonic polarization amplitude at frequency $m\omega_0$ using (13), (16):

$$\frac{dC_q^{m\omega_0}(z)}{dZ} = \frac{-im\omega_0 e}{4P_q^{m\omega_0}} \int\int \left( \frac{n_e A_m(x,y)}{2} e^{im\varphi_e} \cdot \right) \cdot dx \cdot dy, \qquad (17)$$

$$\varphi_e = \varphi_\gamma + k_z^{\omega_0} Z$$

$$\frac{dC_q^{m\omega_0}}{dZ}\bigg|_z = \qquad (18)$$

$$\frac{-im\omega_0 e}{8P_q^{m\omega_0}} e^{im\varphi_\gamma + i(mk_z^{\omega_0} - k_q^{m\omega_0})z} \int\int n_e A_m(x,y) \cdot (\varepsilon_{qy}^{m\omega_0}(x,y))^* \cdot dx \cdot dy$$

It is assumed that $n_e$ is uniform as a function of the transverse dimensions within the layer, and we also substituted $C_q^{\omega_0}(z) = C_q^{\omega_0}(0)$, assuming the non-depleted pump approximation. Equation 18 includes a Z-dependent exponential expression. If the interaction length L is much shorter than the phase coherence length (L<<Λ see eq. 21), then the exponential factor may be set to unity, and Eq. 18 may be integrated, resulting in growth of the harmonic mode field in proportion to L. If one desires higher conversion efficiency, it is possible to maintain phase matching by different techniques. Quasi-phase matching is obtained by periodically modulating the active region as a function of z. In the present case, it can be easily done by modulating periodically the charge carrier density by sequencing active SNM segments and passive dielectric segments, or by periodic removal of doped layers from a single segment layered structure. The charge density can then be expanded into a Fourier harmonic series:

$$n_e(z) = \frac{n_{e0}}{2} \sum_{k=-\infty}^{\infty} rect\left(\frac{z - k\Lambda}{\Lambda_2}\right) = \sum_m n_m e^{i\frac{2\pi mz}{\Lambda}} \qquad (19)$$

$$n_1 = \frac{1}{\Lambda} \int_0^\Lambda n_{e0}(z) e^{-i\frac{2\pi z}{\Lambda}} dz = \frac{2}{\pi} n_{e0} \qquad (20)$$

$$e^{-i\frac{2\pi z}{\Lambda}} \cdot e^{i(mk_z^{\omega_0} - k_q^{m\omega_0})z} = 1 \Rightarrow \Lambda = \frac{2\pi}{k_q^{m\omega_0} - mk_z^{\omega_0}} \qquad (21)$$

$\Lambda_2/\Lambda$ is the periodic function's duty cycle, and is usually taken to be 50%. The SNM first Fourier component (eq. 20-21) is made to cancel the undesired exponential factor in eq. 18.

The power of the $n_{th}$ harmonic frequency can now be calculated. Eq. 21 is introduced into eq. 18 and integrated using the NPA (the power of the fundamental harmonic wave is assumed to be constant along the Z axis, namely, $$P^{\omega_0}(z) = |C_q^{\omega_0}(0)|^2 P_q^{\omega_0} = const. \qquad (22)$$

$$P_{(Z=L)}^{m\omega_0} = P_q^{m\omega_0} |C_{q(Z=L)}^{m\omega_0}|^2$$

$$P_{(Z=L)}^{m\omega_0} = \frac{1}{P_q^{m\omega_0}} \left| \frac{1}{8} m\omega_0 e n_1 L \int_A \int_{(z)} (\varepsilon_{qy}^{m\omega_0}(x,y))^* \cdot A_m(x,y) \cdot dx \cdot dy \right|^2 \qquad (23)$$

The length of the waveguide along the X axis is much larger than the Y dimension. We assume that the waveguide modes are independent of the X axis. Also, we assume that the potential well is very narrow compared with the waveguide width. It is safe to assume that the modal field is constant within the well width.

$$P_{(Z=L)}^{m\omega_0} = \frac{1}{P_q^{m\omega_0}} \left[ \frac{1}{8} m\omega_0 e n_1 |\varepsilon_{qy}^{m\omega_0}(y_l)| LW_x D^2 \int_{-1/2}^{1/2} \bar{A}_m(\bar{y}) \cdot d\bar{y} \right]^2 \qquad (24)$$

$$R_m \equiv \int_{-1/2}^{1/2} \bar{A}_m(\bar{y}) \cdot d\bar{y} \qquad (25)$$

$$P_{(Z=L)}^{m\omega_0} = \frac{1}{P_q^{m\omega_0}} \left[ \frac{1}{8} m\omega_0 e n_1 |\varepsilon_{qy}^{m\omega_0}(y_l)| LW_x D^2 R_m \right]^2 \qquad (26)$$

The parameter $R_m$ can be analytically & numerically calculated. It depends on the potential well symmetry and the harmonic order (m) we want to excite.

When using multiple potential wells in the waveguide, eq. 26 has to be modified to:

$$P_{(Z=L)}^{m\omega_0} = \frac{1}{P_q^{m\omega_0}} \left[ \frac{1}{8} m\omega_0 e n_1 \left| \sum_l \varepsilon_{qy}^{m\omega_0}(y_l) \right| LW_x D^2 R_m \right]^2 \qquad (27)$$

Using the connection $D=\Delta Y_e/\Delta \bar{Y}_e$, eq. 27 can be rewritten as $$P_{(Z=L)}^{m\omega_0} = \frac{1}{P_q^{m\omega_0}} \left[ \frac{1}{8} m\omega_0 e n_1 \left| \sum_l \varepsilon_{qy}^{m\omega_0}(y_l) \right| LW_x \frac{R_m}{(\Delta \bar{Y}_e)^2} \right]^2 (\Delta Y_e)^4 \qquad (28)$$

The dimensionless parameter $R_m/(\Delta \bar{Y}_e)^2$ attains an optimal value for $\Delta \bar{Y}_e \sim 1$ (for m=3 we calculated $\Delta \bar{Y}_e$=0.82). From Eq. 3 it is evident that the optimal design harmonic output power is proportional to the pump power squared and that the power conversion efficiency is proportional to the pump power. This finding seems to be different from the known scaling law dependence on the $m^{th}$ order power of $P^{\omega_0}$ in natural nonlinear crystals. The reason is that the microstructure dimensions (potential well width) can be adjusted to match optimally to the pump power and to the desirable harmonic, something that cannot be done in natural nonlinear crystals, where the nonlinearity stems from the atoms.

Simulation—Computing the Modes of a Layered Slab Waveguide

A Matlab program was written for the calculation of the modes in the layered dielectric slab waveguide. The program enters all the field continuity equations at the layer boundaries in a matrix, and numerically finds the wave propagation wave-numbers for which the matrix has a non-zero solution (for either TE or TM modes). Once the mode propagation constant is known, the modal field is calculated.

Using the Drude formula for conductivity, the refraction index and loss coefficient can be calculated $$\sigma = \frac{Nq^2\tau}{m^*(1-i\omega\tau)} = \frac{Nq^2\tau}{m^*(1+\omega^2\tau^2)}(1+i\omega\tau) \quad (29)$$

$$n = \text{Re}\left\{\sqrt{\frac{\varepsilon}{\varepsilon_0}}\right\} = \text{Re}\left\{\sqrt{n_b^2 + \frac{i\sigma}{\omega\varepsilon_0}}\right\} \quad (30)$$

$$\alpha = 2\frac{\omega}{C}\text{Im}\left\{\sqrt{n_b^2 + \frac{i\sigma}{\omega\varepsilon_0}}\right\} \quad (31)$$

Other Relevant Data:
$n_b^2=12.9$, $m^*=0.067m_0$, $m_0=9.11 \cdot 10^{-31}$ kg, $\varepsilon_0=8.85 \cdot 10^{-12}$ F/m, $q=1.6 \cdot 10^{-19}$ Coulomb=AlGaAs: $n_{(Al_xGa_1 \cdot x_{As})}=3.59-0.71x+0.091x^2=2.97\sim3.59$ The simulations were conducted with the following conditions (which essentially match the structure in FIG. 2: 10 active layers (potential wells) made of intrinsic GaAs, with width D determined for each input power separately. The active layers were positioned near the center of the slab waveguide, separated by 200 nm $Al_{0.8}Ga_{0.2}As$ layers. The layers were assumed to be grown on a 500 μm-thick intrinsic GaAs wafer, forming a 1 mm thick slab dielectric waveguide.

The boundary conditions on the top and bottom surfaces of the waveguide were assumed to be of a perfect conductor. It was assumed that only the fundamental $TE_{01}$ transverse radiation mode was coupled as pump into the parallel plates waveguide at frequency f=100 GHz. The NPA was used to calculate power transfer to the fundamental transverse mode at the third harmonic frequency 300 GHz. The waveguide length was taken to be L=1 cm.

Numerical Results

The following table presents the simulation results. In the table, n is the complex refractive index, $P_{IN}$ is the in-coupled power and $P_{OUT}$ is the simulated third harmonic radiation output power.

| $n_e$ [cm$^{-3}$] | n | | $P_{IN}$ = 1 Watt | $P_{IN}$ = 10 Watt | $P_{IN}$ = 100 Watt |
|---|---|---|---|---|---|
| $10^{15}$ | 4 + 2.6i | D optimal [nm] | 25 | 79 | 250 |
| | | $P_{OUT}$ [W] | 7.5 * 10$^{-6}$ | 7.54 * 10$^{-4}$ | 0.076 |
| | | η [%] | 7.5 * 10$^{-4}$ | 7.54 * 10$^{-3}$ | 0.076 |
| $10^{16}$ | 9.6 + 10.8i | D optimal [nm] | 24 | 76 | 240 |
| | | $P_{OUT}$ [W] | 6.4 * 10$^{-4}$ | 6.5 * 10$^{-2}$ | 6.95 |
| | | η [%] | 0.064 | 0.65 | 6.95 |
| $10^{17}$ | 29 + 35i | D optimal [nm] | 17.8 | 56 | 180 |
| | | $P_{OUT}$ [W] | 0.019 | 1.9 | >20 w |
| | | η [%] | 1.9 | 19 | >20% |

The simulation clearly indicates the significant output power as percentage of input power and the high conversion efficiency that can be achieved in a SNM-WEDS device of the invention.

SUMMARY

In summary, some clear advantages of an SNM-WEDS device of the invention include:
- The nonlinear parameter of the SNM as well as its linear parameters (primarily its transparency) can be designed, maximized and optimized.
- High power radiation and heat dissipation can be handled in a "bulk" based long device.
- High interaction and conversion efficiencies can be attained in frequency mixers and harmonic generators because of the long interaction length, through which the radiation field builds-up coherently. Furthermore, phase matching techniques, used in conventional nonlinear-optics mixers and harmonic generators, and particularly "quasi-phase-matching" can be easily employed in this device and extend its the interaction length to any desirable or practical length.
- The devices are tunable in a range which depends primarily on the tuning range of the radiation pump.

Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. Drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the invention can be implemented, modified, or otherwise altered without departing from its principles and spirit. Therefore, the scope of the invention should be determined by the following claims and their legal equivalents.

Note that while the description above refers specifically and in detail to semiconductor-based SNM-WEDS devices designed for third harmonic generation, the concept and principles of operation described herein may be applied to non-semiconductor based (for example insulator/metal/insulator) metamaterial structures. In both semiconductor and non-semiconductor based metamaterial structures, the same concept can be used for harmonic frequency generation (i.e. for exciting odd harmonics with a symmetrically carrier motion constricting structure and even harmonics with an asymmetrically carrier motion constricting structures). An asymmetric potential well could be created in well known ways, for example, by using delta doping in a layered structure only on one side of the well. The potential well ends up being the shape of a non-symmetric wedge. Furthermore, while the description is focused on the THz region, we believe the principles of operation disclosed herein may be applied to other frequency regions of the spectrum.

While in the theoretical model we assumed steep potential barriers or potential wells, it should be understood that the invention principles apply just as well for any shape of potential barriers or wells. The motion Fourier components may need to be re-calculated for any specific shape that is constructed with the employed technology.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present invention.

We claim:

1. A device comprising a waveguiding electromagnetically distributed structure (WEDS) which includes monolithically a synthetic nonlinear material (SNM) comprised of a plurality of nonlinear microstructures, each microstructure including a constricting potential well structure housing oscillating charge carriers, wherein the WEDS has an interaction length and wherein the SNM is operative to up-convert input microwave or mm-wave radiation into higher frequency output radiation in a coherent, phase-matched way along the interaction length.

2. The device of claim 1, further comprising a dielectric bounding element surrounding at least partially the waveguiding electromagnetically distributed structure.

3. The device of claim 2, wherein the dielectric bounding element is a hollow dielectric waveguide.

4. The device of claim 1, wherein the oscillating charge carriers have a constricted oscillatory motion induced by the input radiation.

5. The device of claim 4, wherein the constricting potential well structure constricts the oscillatory motion in a direction of a polarization component of the input radiation.

6. The device of claim 5, further comprising a delta doped layer adjacent to the potential well for providing the charge carriers.

7. The device of claim 1, wherein the higher frequency is a frequency selected from the group consisting of an odd multiple of the input frequency and an even multiple of the input frequency.

8. The device of claim 1, wherein the potential well is a three-dimensional potential well.

9. A device comprising a waveguiding electromagnetically distributed structure (WEDS) which includes monolithically a synthetic nonlinear material (SNM)) comprised of a plurality of nonlinear microstructures, each microstructure including a constricting potential well structure housing oscillating charge carriers, wherein the WEDS has an interaction length and wherein the SNM is operative to convert input microwave or mm-wave radiation of a first frequency and of a second frequency into a mixed frequency output radiation of a third frequency in a coherent, phase-matched way along the interaction length.

10. The device of claim 9, further comprising a dielectric bounding element surrounding at least partially the waveguiding electromagnetically distributed structure.

11. The device of claim 10, wherein the dielectric bounding element is a hollow dielectric waveguide.

12. The device of claim 9 wherein the oscillating charge carriers have a constricted oscillatory motion induced by the input radiation.

13. The device of claim 12, wherein the constricting potential well structure constricts the oscillatory motion in a direction of a polarization component of the input radiation.

14. The device of claim 9, wherein the higher frequency is a frequency selected from the group consisting of an odd multiple of the input frequency and an even multiple of the input frequency.

15. The device of claim 9, wherein the constricting potential well structure is a three-dimensional potential well.

16. The device of claim 9, further comprising a delta doped layer adjacent to each potential well for providing the charge carriers.

17. The device of claim 9, adapted for parametric amplification.

18. The device of claim 9, adapted for parametric oscillation.

19. A method for generating terahertz radiation comprising the steps of:
a) providing a waveguiding electromagnetically distributed structure (WEDS) which includes monolithically a synthetic nonlinear material (SNM) comprised of a plurality of nonlinear microstructures, each microstructure including a constricting potential well structure housing charge carriers which perform a constricted oscillation motion and wherein the WEDS has an interaction length;
b) inputting microwave or mm-wave radiation into the WEDS; and
c) using the SNM to up-convert the input microwave or mm-wave radiation into higher frequency output radiation in a coherent, phase-matched way along the interaction length, wherein the higher frequency is a higher harmonic of the input frequency.

* * * * *